E. R. CHAMBERS.
COVER FOR COOKING UTENSILS.
APPLICATION FILED OCT. 11, 1907.
918,282.
Patented Apr. 13, 1909.
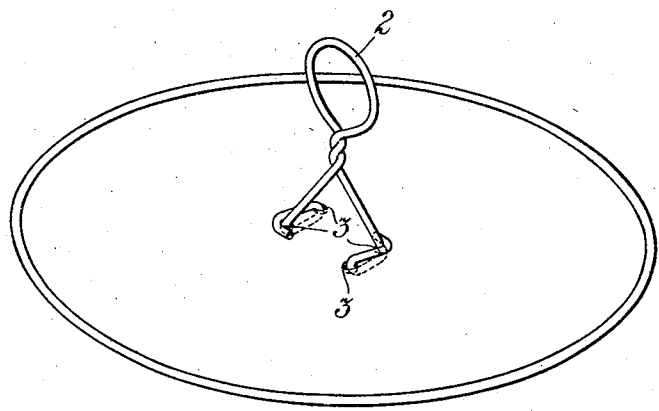
Witnesses:
Sydney E. Taft
Ernst A. Helfer
Inventor:
Elizabeth R. Chambers.

UNITED STATES PATENT OFFICE.

ELIZABETH R. CHAMBERS, OF EAST DEDHAM, MASSACHUSETTS.

COVER FOR COOKING UTENSILS.

No. 918,282.  Specification of Letters Patent.  Patented April 13, 1909.

Application filed October 11, 1907. Serial No. 396,975.

*To all whom it may concern:*

Be it known that I, ELIZABETH R. CHAMBERS, a citizen of the United States, residing at East Dedham, in the county of Norfolk and State of Massachusetts, have invented a new and useful Cover for Cooking Utensils, of which the following is a specification.

The object of this invention is to provide a cover for cooking utensils in which the handle thereof will remain cool so as to be easily handled, and which can be cheaply and easily constructed.

The nature of the invention will more fully appear from the accompanying description and will be pointed out particularly in the claim.

The drawing shows the invention in the preferred form.

The single figure of the drawing represents the cover in perspective.

The cover is adapted to be used on any kind of cooking utensil and is preferably made of tin in the form that covers are usually made.

The cover near its center is provided with four punctures or perforations marked 3 in the drawing, arranged in two parallel rows.

The handle itself is made of wire, the middle portion of the handle being twisted upon itself to form a loop or ring 2, and the two ends of the handle are passed down through diagonally opposite punctures 3. The ends of the handle at the bottom of the cover are then bent upwardly to the remaining punctures 3, and bent again along the upper surface of the cover and into a hook about the ends of the wire handle where they first passed down through the cover. The loop or ring is thus left at some distance above the cover and the ends of the handle where it passes through the punctures engage the cover more or less loosely. It is found that the connection of the handle with the cover thus described prevents the heat of the cover passing in any material extent to the handle itself so that the handle always remains cool and capable of being handled at all times. The handle itself is easy to grasp and the construction is one which can be made cheaply and easily. It prevents the burning of the hands and renders unnecessary the using of a cloth or other device with which to seize the cover. The handle also may readily be attached to an old cover by simply making the punctures 3 therein already described.

The form of connection described with the handle of the cover enables the cover to be kept clean and prevents the accumulation of rust and hence the dropping out of the handle.

What I claim and desire to secure by Letters Patent, is:

A cover for cooking utensils comprising a metal disk provided at its central portion with four perforations arranged in two pairs, a handle formed of a piece of wire bent to form a loop or ring, two portions of said wire passing downwardly through two of said perforations, respectively, which are diagonally opposite each other, along the under surface of said disk, thence upwardly through the remaining two of said perforations, thence along the upper surface of said disk and bent to form two hooks respectively connected to said two portions above and adjacent to said disk, said wire loosely fitting said perforations.

ELIZABETH R. CHAMBERS.

Witnesses:
FRANK M. BAILEY,
MARGARET GALLWAY.